Jan. 5, 1960
G. T. TIMOFF ET AL
2,920,186
VEHICLE DOME LIGHT
Filed Jan. 17, 1958
2 Sheets-Sheet 1
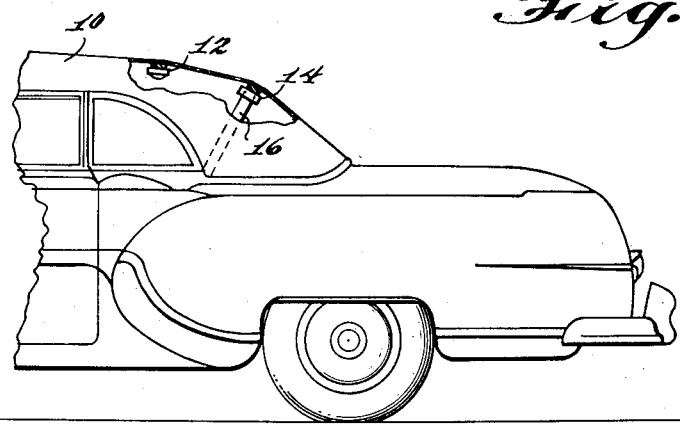
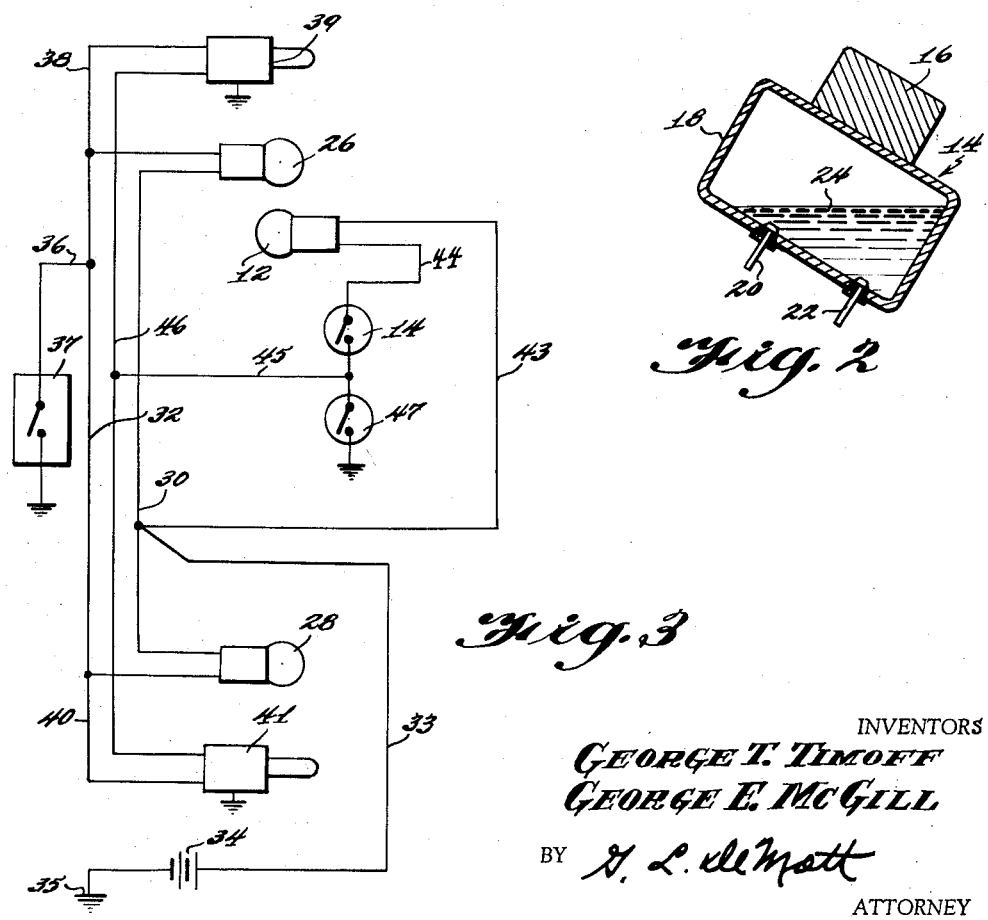
INVENTORS
GEORGE T. TIMOFF
GEORGE E. McGILL
BY G. L. DeMott
ATTORNEY Jan. 5, 1960 G. T. TIMOFF ET AL 2,920,186
VEHICLE DOME LIGHT
Filed Jan. 17, 1958 2 Sheets-Sheet 2

INVENTORS
GEORGE T. TIMOFF
GEORGE E. McGILL
BY G. L. deMott
ATTORNEY ns
2,920,186
VEHICLE DOME LIGHT George T. Timoff, Drayton Plains, and George E. McGill, Pontiac, Mich., assignors to General Motors Corporation, Detroit, Mich., a corporation of Delaware Application January 17, 1958, Serial No. 709,643

1 Claim. (Cl. 240—7.35)

This invention relates generally to motor vehicle dome light circuits and more particularly to switching means for such circuits as employed in motor vehicles having a convertible top.

In a vehicle with a convertible top there is a possibility that the dome light attached to and movable with the top will be left lighted when the top is in its lowered position. One result of this condition is wasteful consumption of power which will cause the battery to discharge when the vehicle is left standing. It is the general trend in present automotive production to supply the vehicle with an increasing number of power consuming devices and, therefore, conservation of power has become important.

Accordingly, an object of this invention is to provide an improved switching system for dome light circuits that prevents energization of such circuits when the convertible top is lowered, and further prevents wasteful power consumption and battery discharge. The above and other objects and advantages of this invention will be made more apparent from the following description when read in connection with the accompanying drawings wherein like reference numerals refer to like parts and wherein:

Figure 1 is a fragmentary side elevation view of a vehicle with a convertible top having a dome light and switch embodying the present invention;

Figure 2 is an enlarged view of the switch of Figure 1;

Figure 3 is a diagram of one form of electric circuit suitable for actuation of the dome light of Figure 1.

Figure 4:
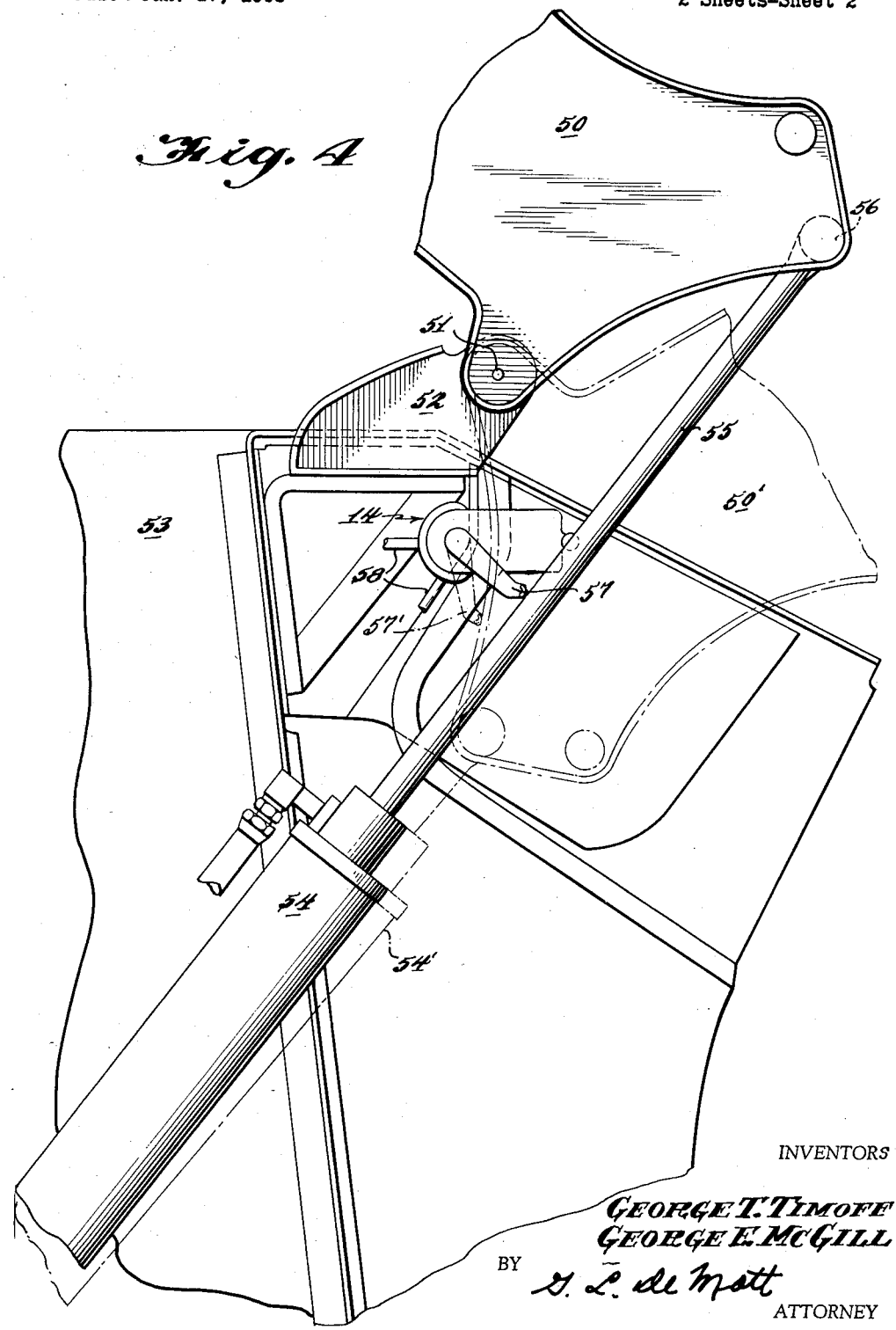
Figure 4 is an enlarged fragmentary elevation view of a convertible vehicle top raising mechanism and switch actuating mechanism embodying the present invention.

In Figure 1 a vehicle is shown with a convertible top 10, having a dome light 12 secured to it by any suitable means for movement therewith, and further having a tilt responsive switch 14 in circuit with the light and secured to the top support rib 16 for movement with the support rib. The switch 14, which may be of the mercury type, shown in detail in Figure 2, comprises a housing 18 having electrodes 20 and 22 projecting into the housing and insulated therefrom. A conducting medium 24, such as mercury, is enclosed within the housing and is of sufficient volume to cover both electrodes while the top is in the raised position, as shown. When the top is moved to its lowered position, rib 16 assumes a nearly horizontal position and the mercury pool 24 uncovers the electrode 20 thus breaking the electric circuit through the switch to prevent energization of the dome light.

Referring to Figure 3, the circuit including the dome light 12 and tilt responsive switch 14 is connected with the vehicle courtesy lamp circuit including a first courtesy lamp 26 which may be located near the right front door of the vehicle and a second courtesy lamp 28 located near the left front door. The lamps 26 and 28 are connected in parallel through lines 30 and 32. Line 30 is connected through line 33 to one terminal of a battery 34, the other terminal of which is grounded at 35. Line 32 is connected to ground to complete the courtesy lamp circuit either through line 36 and manually operable courtesy lamp switch 37; line 38 and right door switch 39; or line 40 and left door switch 41.

The dome light 12 has one of its terminals connected through line 43 to line 33 and battery 34. The other terminal of the dome light is connected to ground through line 44, tilt responsive switch 14, lines 45 and 46 through either of the door switches 39 or 41. A manually operable switch 47 connected between line 45 and ground provides an alternate grounding circuit for dome light 12 and switch 14.

It is seen that an energizing circuit for the dome light 12 is completed across battery 34 through either of the door switches 39, 41 or through the manual switch 47. However, neither circuit can be completed as long as the tiltable switch 14 is open. Since switch 14 is open whenever the convertible top is in its lowered position actuation of switches 39, 41 or 47 is ineffective to energize the dome lamp and wastefully consume power from the battery.

It is to be understood that any switch which is sensitive to a tilting movement may be used in place of switch 14, and further that the switch 14 could be mounted on any member which will tilt with movement of the top to open or close the switch contacts.

Referring now to Figure 4, the convertible top support plate 50 is pivoted at 51 to a plate 52 that is secured to one side of the vehicle body 53. An hydraulic cylinder 54 is pivoted at its lower end (not shown) to the vehicle body and actuates a piston and a piston arm 55. The free end of the piston arm 55 is pivotally connected to the support plate 50 as at 56. The support plate 50 is movable from its lowered position 50', shown in broken lines, to its raised position, shown in full lines, by the hydraulic actuator 54 also shown in the lowered position by broken lines at 54'. The tilt responsive switch 14 is mounted on the vehicle body adjacent the support plate by any suitable means. A pivotal switch actuating arm 57 is provided on the switch 14 and is spring biased to switch-closed position as shown in full lines. The arm is disposed in the path of movement of support plate 50 so that when the support plate is moved to lowered position 50' it contacts the arm 57 and the arm is moved to its dotted line position 57', thus opening the switch. Switch terminals 58 connect the switch to the remainder of the dome light circuit.

In operation, the support plate 50 actuates the top 10 of the convertible in a conventional manner. When the top 10 is raised the support plate 50 is raised and the switch arm 57 is permitted to move to the closed position, thus completing the dome light circuit and permitting the light circuit to be energized by a manual switch or a door switch as has been described. When the top is lowered, support plate 50 moves to its lower position. The switch arm 57, in the path of movement of the plate, is engaged and moved by the plate to its open position to open the switch contacts and prevent the dome light circuit from being energized regardless of the condition of any other part of the circuit.

It should be noted that switch 14, shown as mounted on vehicle body 53, could be mounted in any place where the motion of any part of the top actuating linkage would serve to move the pivotal arm 57 to its open position when the top is lowered, and permit the arm to move to its closed position when the top is raised.

Other switches suggested for use for switch 14 are mercury, mechanical, or electrical relay switches integral with the convertible top control switch to interrupt the dome lamp circuit when the top is in a raised position.

In the operation of this invention it is clear that the danger of discharging a battery by unintentionally leaving the dome lamp switch turned "on" is eliminated.

What is claimed is:

In combination with a vehicle, a convertible top, means for moving said top between a raised and a lowered position, a dome light secured to and movable with said top, an electric circuit connected to said dome light and actuable to turn said dome light on and off, a switch in said circuit to open and close said circuit, and means mechanically coupling said switch and said means for moving said top whereby said switch is in its open position when said top is moved to its lowered position and is in its closed position when said top is moved to its raised position.

References Cited in the file of this patent

UNITED STATES PATENTS

| | | |
|---|---|---|
| 2,101,748 | Michel et al. | Dec. 7, 1937 |
| 2,344,129 | Clayton | Mar. 14, 1944 |
| 2,601,142 | Hubbard | June 17, 1952 |
| 2,736,005 | Craddock | Feb. 21, 1956 |